(12) United States Patent
Bromley et al.

(10) Patent No.: US 8,615,498 B1
(45) Date of Patent: Dec. 24, 2013

(54) SYSTEMS AND METHODS FOR MIGRATING AN OBJECT FROM A DEDUPLICATION STORE TO AN EXTERNAL DOMAIN

(75) Inventors: Graham Bromley, Dublin, CA (US); Thomas Clifford, Edina, MN (US); Jon Genda, Rogers, MN (US); Jian Jun Lu, Beijing (CN); James Ohr, St. Paul, MN (US); Yi Qu, Beijing (CN); Weibao Wu, Vadnais Heights, MN (US); Wei-Zhen Zhu, Beijing (CN)

(73) Assignee: Symantec Corporation, Mountain View, CA (US)

( * ) Notice: Subject to any disclaimer, the term of this patent is extended or adjusted under 35 U.S.C. 154(b) by 735 days.

(21) Appl. No.: 12/487,955

(22) Filed: Jun. 19, 2009

(51) Int. Cl.
*G06F 7/00* (2006.01)
*G06F 17/00* (2006.01)

(52) U.S. Cl.
USPC .......................................... 707/692; 707/664

(58) Field of Classification Search
USPC .................................. 707/664, 692, 999.101
See application file for complete search history.

(56) References Cited

U.S. PATENT DOCUMENTS

| | | | |
|---|---|---|---|
| 7,962,520 B2 * | 6/2011 | Patterson et al. | 707/791 |
| 8,005,861 B2 * | 8/2011 | Reddy et al. | 707/790 |
| 8,176,104 B2 * | 5/2012 | Cannon et al. | 707/825 |
| 2008/0243878 A1 * | 10/2008 | de Spiegeleer et al. | 707/999.1 |
| 2009/0234892 A1 * | 9/2009 | Anglin et al. | 711/162 |
| 2010/0036887 A1 * | 2/2010 | Anglin et al. | 707/E17.005 |
| 2010/0205389 A1 * | 8/2010 | Kishi | 711/162 |
| 2010/0250501 A1 * | 9/2010 | Mandagere et al. | 707/692 |
| 2010/0274768 A1 * | 10/2010 | Wang et al. | 707/676 |

\* cited by examiner

*Primary Examiner* — Charles Lu
(74) *Attorney, Agent, or Firm* — Holland & Hart LLP

(57) ABSTRACT

A computer-implemented method for migrating an object from a deduplication store to an external domain in an external media is described. A deduplication store (dstore) deduplication map (dmap) is retrieved from a dstore for an object stored in the dstore. A determination is made as to whether an external dmap exists in the external domain for an object referenced in the dstore dmap. If the external dmap exists, a determination is made as to whether data referenced in the dstore dmap exist in the external dmap. If the referenced data do not exist, the referenced data is extracted from the dstore to the external domain. If the external dmap does not exist, the object and the associated dmap are extracted from the dstore to the external domain.

20 Claims, 10 Drawing Sheets

SYSTEMS AND METHODS FOR MIGRATING AN OBJECT FROM A DEDUPLICATION STORE TO AN EXTERNAL DOMAIN

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Computer technologies used by consumers and by the business world continue to demand that the efficiency of these technologies increase. These demands have led to advances in computer technologies that have improved the ways in which data are stored on a computer system. Storage capacity within a computer system is a finite quantity. In order to store as many data as possible within a computer system, technology exists that eliminates redundant data so that multiple copies of the same data are not stored within a computer system. Eliminating redundant data improves data protection, increases the speed of the computer system, and reduces costs associated with the storage of the data. Computer systems may include a mechanism that performs this elimination of redundant data. This mechanism may be known as a deduplication appliance (or deduplication store).

While the storage capacity of a computer system may be increased by eliminating redundant data, the amount of data that is stored also continues to increase. As such, the need for more storage capacity will also increase. Data may be removed from the storage of a computer system and stored at a location external to the computer. Currently, however, data that have been deduplicated within the computer system cannot be transferred to an external storage device while remaining in a deduplicated form. This causes the storage capacity of the external storage device to also increase as non-deduplicated data are stored. As shown from the above discussion, there is a need for systems and methods to migrate a data object from a deduplication store to an external domain while maintaining the object in deduplicated form.

SUMMARY

According to at least one embodiment, a computer-implemented method for migrating an object from a deduplication store to an external domain in an external media is described. A deduplication store (dstore) deduplication map (dmap) may be retrieved from a dstore for an object stored in the dstore. A determination may be made as to whether an external dmap exists in the external domain for an object referenced in the dstore dmap. If the external dmap exists, a determination may be made as to whether data referenced in the dstore dmap exist in the external dmap. If the referenced data do not exist, the referenced data may be extracted from the dstore to the external domain. If the external dmap does not exist, the object and the associated dmap may be extracted from the dstore to the external domain.

In one embodiment, a determination may be made as to whether the identification of the object referenced in the external dmap matches the identification of the object associated with the external dmap. The data referenced in the external dmap may be appended to data owned by the object associated with the external dmap, if the identification of the object referenced in the external dmap matches the identification of the object associated with the external dmap. In one configuration, the external dmap of the object in the external domain may be updated.

In one embodiment, data referenced in the external dmap may be appended to data owned by the object referenced in the external dmap, if the identification of the object referenced in the external dmap does not match the identification of the object associated with the external dmap. The external dmap of the referenced object in the external domain may be updated.

In one example, the external dmap may include an entry for each extent of data present in the object. The external dmap may include pointers configured to point to private data stored as part of the object. In addition, the external dmap may include pointers configured to point to shared data stored as part of a second object in the dstore. The pointers configured to point to shared data may be independent of an internal deduplication mechanism of the dstore.

A computer system configured to migrate an object from a deduplication store to an external domain in an external media is also described. The computer system may include a processor and memory in electronic communication with the processor. The system may also include an object application configured to retrieve a deduplication store (dstore) deduplication map (dmap) from a dstore for an object stored in the dstore, and determine whether an external dmap exists in the external domain for an object referenced in the dstore dmap. If the external dmap exists, the application may be configured to determine whether data referenced in the dstore dmap exist in the external dmap. If the referenced data do not exist, the application may be configured to extract the referenced data from the dstore to the external domain. If the external dmap does not exist, the object and the associated dmap may be extracted from the dstore to the external domain.

A computer-program product for migrating an object from a deduplication store to an external domain in an external media is also described. The computer-program product may include a computer-readable medium having instructions thereon. The instructions may include code programmed to retrieve a deduplication store (dstore) deduplication map (dmap) from a dstore for an object stored in the dstore and code programmed to determine whether an external dmap exists in the external domain for an object referenced in the dstore dmap. If the external dmap exists, the instructions may include code programmed to determine whether data referenced in the dstore dmap exist in the external dmap. If the referenced data do not exist, the instructions may include code programmed to extract the referenced data from the dstore to the external domain. If the external dmap does not exist, the instructions may include code programmed to extract the object and the associated dmap from the dstore to the external domain.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
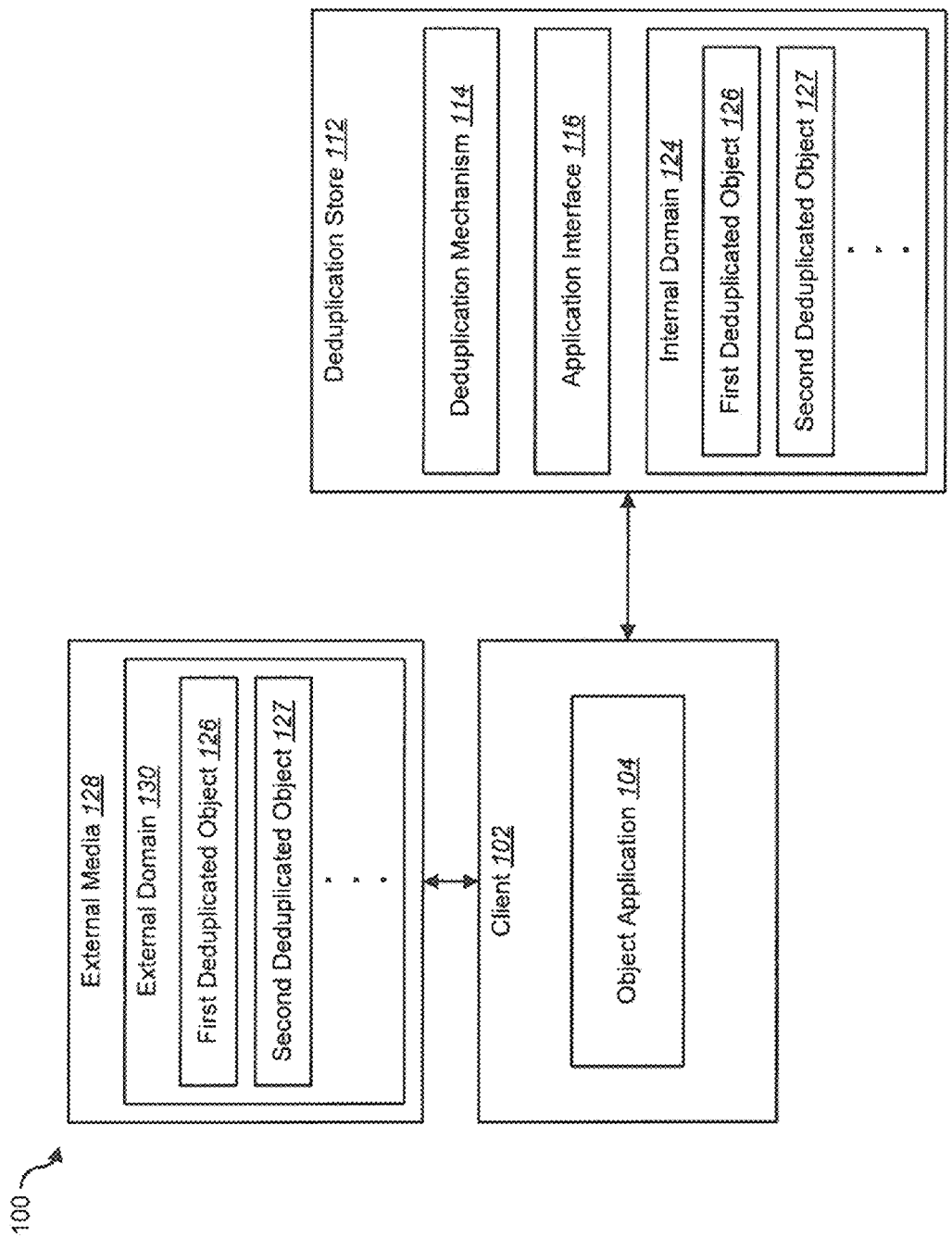
FIG. 1 is a block diagram illustrating one embodiment of a client communicating with a deduplication store (dstore)

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In computing systems, data deduplication may refer to the elimination of redundant data. In the deduplication process, duplicate data may be deleted, leaving only one copy of the data to be stored. The deduplicated data may be stored within a deduplication store ("dstore") (e.g., a deduplication appliance). Current dstores may provide an interface across which data are always deduplicated (on write) and reconstructed (on read). Currently, the data must remain in a dstore, if the data are to remain deduplicated. In other words, current implementation of dstores require that data remain in a dstore in order to remain in a deduplicated form. When data are extracted from a dstore, the dstore may reconstruct the data to their original form. As such, the data no longer remain deduplicated.

The current implementation of dstores described above requires the storage capacity of dstores to constantly increase. For example, as data continue to be written to a dstore (and deduplicated), the space within the dstore may continue to increase as additional data are stored. In one embodiment, the present systems and methods allow objects to be extracted from a dstore by an application and stored to media that is outside the control of the dstore. In one example, this external media may be disk or tape. The present systems and methods may extract deduplicated data from a dstore and migrate the data to an external media while maintaining the data in a deduplicated form. The application may subsequently reconstruct the original object efficiently from the external media. In one embodiment, the present systems and methods do not depend on the specific deduplication mechanisms within the dstore, or on other particular applications to extract deduplicated data from a dstore and place the data in the external media (still in deduplicated form). The application that extracts the deduplicated data from a dstore, and migrates the data to the external media, may be outside control of the dstore.

The present systems and methods may be applied to image-oriented or file-oriented data streams. In one embodiment, an image-oriented stream contains some number of objects, such as files, embedded within the stream opaquely, and a file-oriented stream presents files discretely.

Referring now to the figures, FIG. 1 is a block diagram illustrating one embodiment 100 of a client 102 communicating with a dstore 112. In one embodiment, the client 102 may be, without limitation, a workstation, a laptop, a personal digital assistant ("PDA"), a handheld device, or any other type of computing system or device. The client 102 may include an object application 104 that interfaces with the dstore 112. The application 104 may write objects to and extract objects from the dstore 112. An object may be an aggregate of data. Examples of an object may include a backup image, a file, etc.

In one configuration, the dstore 112 may be a storage system that deduplicates objects written to it. The dstore 112 may include a deduplication mechanism 114 that may analyze an object written to the dstore 112. The mechanism 114 may perform data deduplication on the object in order to eliminate any redundant data within the object so that a single copy of data is stored on the dstore 112.

The dstore 112 may also include an application interface 116. The application interface 116 may allow the dstore 112 to communicate or interface with the object application 104. Details regarding the application interface 116 will be described below.

A deduplication domain ("domain") may be a logical space containing a set of deduplication objects. In one embodiment, the domain may refer to an internal domain 124 ("idomain") on the dstore 112 and/or an external domain 130 ("edomain") on an external media 128. The domain may be fully self-referential if all objects within the domain can be reconstructed by reference to data stored within the same domain. Further, a domain may be partially self-referential, in that some objects can be fully reconstructed from data within the same domain, but others cannot. In one configuration, an object in one domain cannot contain references to objects within other domains.

In one embodiment, the idomain 124 may refer to a domain on the dstore 112. In one example, the dstore 112 may include multiple idomains, however, a single idomain 124 is illustrated for clarity. The idomain 124 may include a first deduplicated object 126 and a second deduplicated object 127. While only two objects 126, 127 are illustrated, the idomain 124 may include more or less than two deduplication objects. In one configuration, the idomain 124 may be fully self-referential with respect to all objects contained within the idomain 124. For example, if the first object 126 is created before the second object 127, the second deduplicated object 127 may be fully reconstructed by reference to data within the second deduplicated object 127 or by reference to the first deduplicated object 126. In other words, objects may only reference objects that are already present in the idomain 124, because the idomain 124 may be self-referential as explained above.

The client 102 may also communicate with the external media 128. The external media 128 may be a disk or tape that stores one or more objects. In one configuration, the external media 128 may include multiple edomains, however, a single edomain 130 is illustrated for clarity. The edomain 130 may be established by the object application 104 and may be external (or separate) from the idomain 124 on the dstore 112. The edomain 130 may be under the control of the object application 104 and independent from the dstore 112. Self-referentiality of the edomain 130 may be the responsibility of the application 104 that established the edomain 130. In one configuration, the object application 104 may extract the first deduplicated object 126 and the second deduplicated object 127 from the idomain 124. The application 104 may write the objects 126, 127 to the edomain 130. Objects 126, 127 within the edomain 130 may remain in deduplicated form. In one embodiment, the object application 104 may reconstruct an object by extracting deduplicated objects 126, 127 from the edomain 130.

The present systems and methods allow the application 104 to manage the edomain 130 such that if the deduplicated objects 126, 127 are extracted from the idomain 124 and inserted into the edomain 130, duplicate data may be avoided among the objects in the extracted set (i.e., deduplicated objects 126, 127), and, between all other objects in the edomain 130 after insertion of the extracted set. In one configuration, as objects are inserted in the edomain 130 over time, duplicate data may be avoided. This behavior is similar to that which is typical of idomains, except that deduplication in the idomain 124 is controlled by the internal deduplication mechanism 114 of the dstore 112 that contains the idomain 124, whereas the edomain 130 may be controlled by the application 104.

Figure 2:
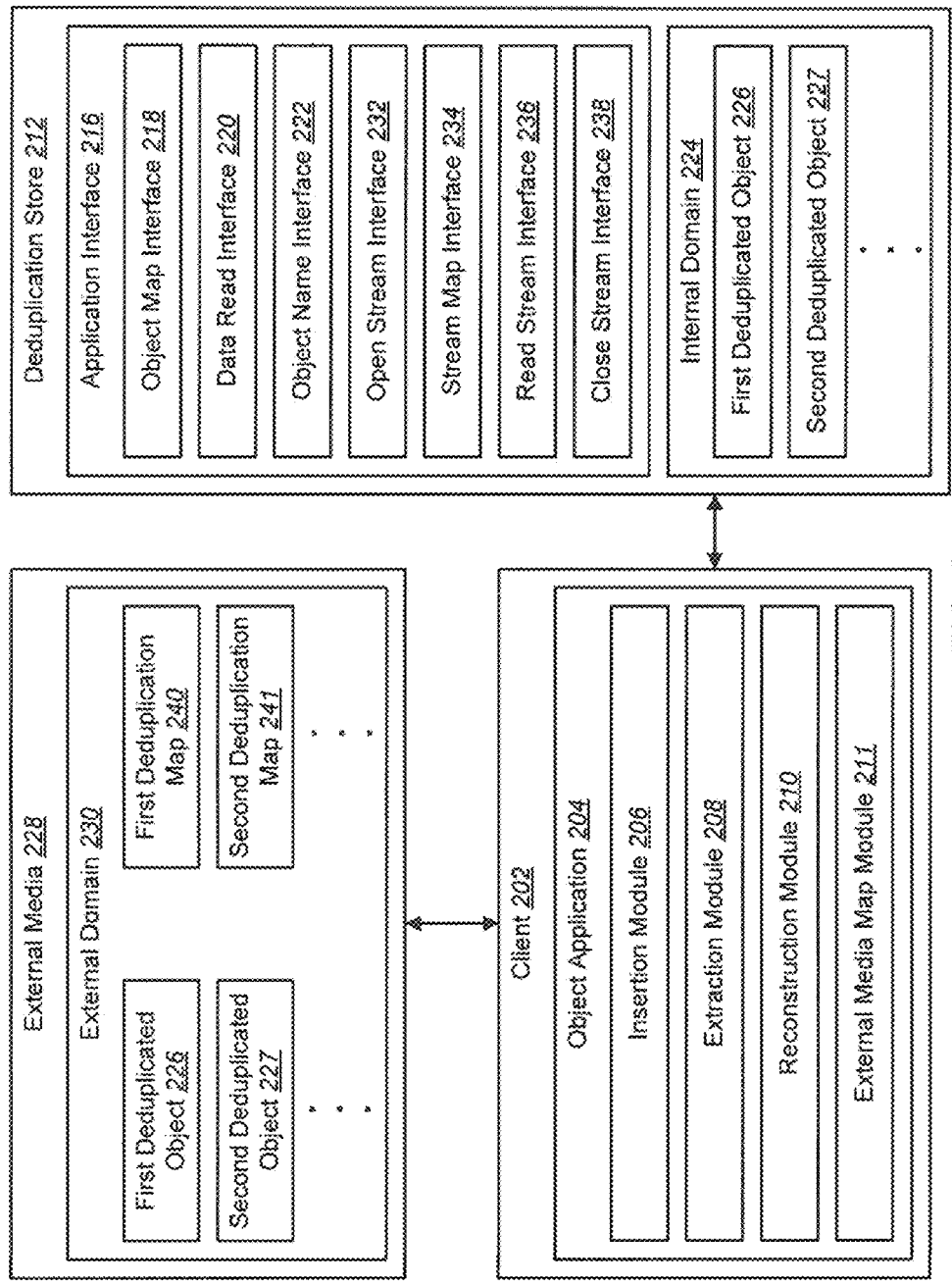
FIG. 2 is a block diagram illustrating a further embodiment of a client communicating with a dstore.

FIG. 2 is a block diagram illustrating a further embodiment 200 of a client 202 communicating with a dstore 212. The client 202 may also communicate with an external media 228.

In one configuration, the dstore 212 may include an application interface 216 that provides various interfaces to an object application 204 on the client 202. For example, the application interface 216 may include an object map interface 218 (e.g., "getDdupMap"). In one embodiment, the object map interface 218 may return a deduplication map ("dmap") of an object that is identified by an object identifier ("objectID"). In one configuration, the objectID may be a unique identifier for an object written to the dstore 212. The objectID may be assigned to the object by the dstore 212, and may be globally unique and valid forever.

In one example, the dmap may be an entity in a domain (e.g., an idomain 224 and/or an edomain 230) that contains a table of object references that define the data needed to reconstruct a deduplicated object. An object reference within the dmap may include an objectID, an object offset, a reference objectID, a reference offset, and a length. An entry in a dmap may reference the object's owned data or another object in the same edomain. If the edomain 230 is self-referential with respect to the object, the dmap may allow the object to be fully reconstructed from data within the edomain 230.

Object data may be owned by an object if the data are unique in the dstore 212, when the object is written to the dstore 212. The association between owned data and the objectID of the owning object may permanent. In the edomain 230, the dmap of any object in the edomain 230 that references object data in a dmap other than the dmap of the owning object, may refer to the data by a reference offset that is relative to the reference object. In one embodiment, a reference from the owning object may always be relative to the owned data itself.

In one configuration, the reference offset may vary depending on whether the dmap is for an object in an idomain 224 or an edomain 230. In the dmap of an object in the idomain 224, if an object reference points to data owned by the object itself, the reference offset may be identical to the corresponding object offset. In one embodiment, the data may be read from that offset in the object itself. If, however, an object reference points to data owned by another object, the reference offset may be an object offset for the referenced object. In one configuration, the data may be read at that offset in the referenced object.

In the dmap of an object in an edomain 230, if an object reference points to data owned by the object itself, the reference offset may point into the object's owned data. In one example, the data may be read at that offset in the owned data. If, however, an object reference points to data owned by another object, the reference offset may be an object offset for the referenced object. In one embodiment, the data may be read according to the dmap of the referenced object.

In another embodiment, in the dmap of an optimized deduplication stream, a reference offset may be relative to byte "0" of the stream. The data may be read at that offset in the stream.

The interface 216 may also include a data read interface 220 (e.g., "readDedupObject"). In one embodiment, the interface 220 may use a dmap to read data from an object according to the objectID, the object offset, and the length specified in the dmap. The interface 216 may further include an object name interface 222 (e.g., "getDedupObjectName"). The interface 222 may return the name of an object identified by the objectID. In one embodiment, an object name may be specified by the object application 204 that writes the object to the dstore 212. In one configuration, an objectID may be assigned to the object name by the dstore 212.

In addition to extraction of deduplicated data from the dstore 212 by reads against objects, the dstore 212 may export an optimized deduplication stream ("dstream") for a set of objects, or parts of objects, within the dstore 212. The dstore 212 may implement an optimized dstream if doing so provides a significant advantage over reading data directly from objects. By exporting an optimized dstream, the dstore 212 may ensure that the application 204 extracts deduplicated data with optimal performance, independently of the dstore 212 implementation.

In order to export dstreams for a set of objects, the application interface 216 may further include an open stream interface 232 (e.g., "openDedupStream"). The interface 232 may return a stream handle that allows the specified data to be read from the dstore 212 in an optimal way. For example, a dmap argument may define required data, in terms of object extents. In one example, an extent may be a contiguous blob of data that is identified by the objectID, byte offset, and byte length.

In one configuration, the object application 204 may first obtain the dmap for an object of interest using the object map interface 218. The object application 204 may then compare the returned dmap against the dmaps in the external domain 230 to determine which object data is required to be extracted from the dstore 212. In the returned dmap, if an extent is not wanted, the object application 204 may set the length field to "0". In one example, the dmap may be returned to the dstore 212 through the open stream interface 232. The returned flag may indicated whether the stream dmap is identical to the argument dmap. If it is not, the stream dmap may be obtained through a stream map interface 234 (e.g., "getDedupStreamMap").

In one configuration, the stream map interface 234 may return the dmap for an associated dstream. The stream map may differ from the dmap argument test passed to the open stream interface 232 if the read pattern implied by the dmap argument would not be optimal. The application interface 216 may further include a read stream interface 236 ("readDedupStream"). The interface 236 may read length bytes from the current position in a dstream specified by a stream handle. The bytes may be read into a buffer. The application interface 216 may also include a closed stream interface 238 ("closeDedupStream") which may close a stream handle that is returned by the open stream interface 232.

In one embodiment, the object application 204 may include an insertion module 206 that may insert or write an object to the dstore 212. As previously explained, an object written to the dstore 212 may then be deduplicated and stored in the internal domain 224 as a first deduplicated object 226, second deduplicated object 227, etc. The object application 204 may also include an extraction module 208 that may extract some or all of the deduplicated objects 226, 227. The extracted objects may be migrated (or written) to an external media 228. In one configuration, the objects 226, 227 may remain in a deduplicated form when stored in the external domain 230 of the external media 228.

The object application 204 may also include a reconstruction module 210 that may reconstruct deduplicated objects 226, 227 stored in the external domain 230. The reconstruction module 210 may reconstruct an original object from the deduplicated objects 226, 227. In one embodiment, the object application 204 may also include an external media map module 211. The map module 211 may generate and update dmaps 240, 241 in the external domain 230. Each dmap 240, 241 may be associated with an object written to the external domain 230.

Figure 3:
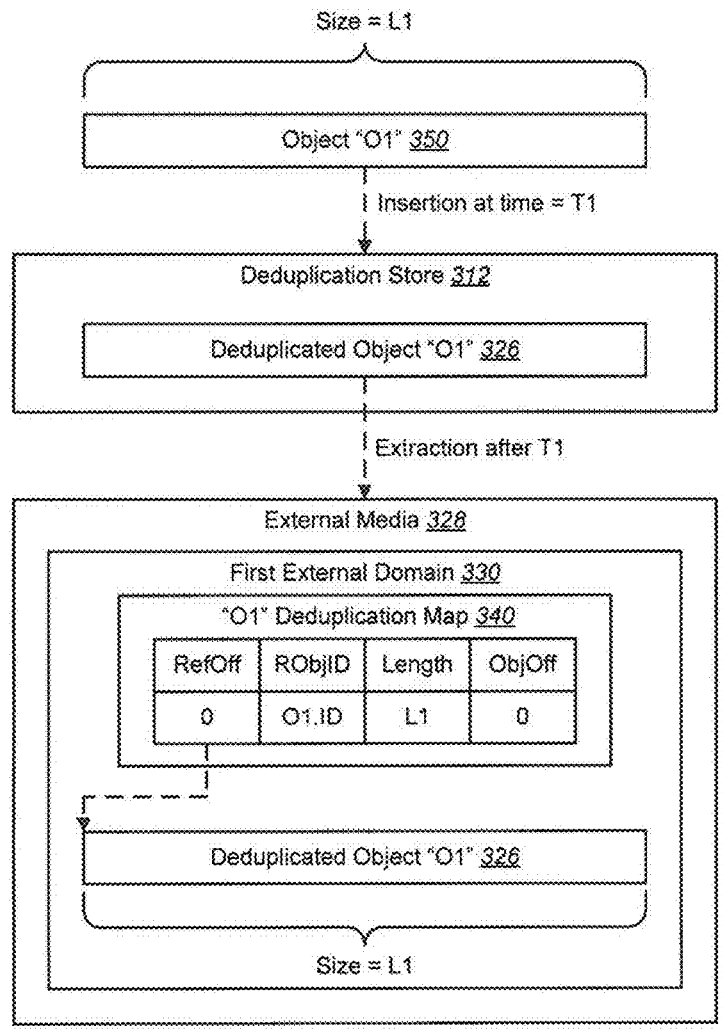
FIG. 3 is a block diagram illustrating one example of an original object "O1" being written to a dstore, and then later extracted from the dstore to a first external domain (edomain) on an external media.

FIG. 3 is a block diagram illustrating one example of an original object "O1" 350 being written to a dstore 312, and then later extracted from the dstore 312 to a first edomain 330 on an external media 328. In one embodiment, the object "O1" 350 may have a size or length equal to L1. The object 350 may be inserted into the dstore 312 at a time equal to T1. When the object 350 is written to the dstore 312, the dstore 312 may perform deduplication on the object 350 such that a deduplicated object "O1" 326 is stored with in the Dstore 312. In this example, the dstore 312 is empty at time T1, so all of the data for the object "O1" 350 may be stored in the dstore 312. In other words, in this example, the original object "O1" 350 and the deduplicated object "O1" 326 are identical.

In one embodiment, at a time subsequent to the time T1, extraction of the deduplicated object "O1" 326 may occur. The deduplicated object 326 may be extracted to the first edomain 330. The first edomain 330 may include an "O1" dmap 340 associated with the deduplicated object "O1" 326. In this example, the dmap 340 includes a single entry with the categories reference offset ("RefOff"), reference objectID ("RObjID"), length, and object offset ("ObjOff"). In one embodiment, the dmap 340 may also include an objectID category (not shown). The objectID category may include the objectID assigned to the object (e.g., "O1.ID").

In one example, the ObjOff may be set to "0", the length may be set to L1, and the reference offset may set equal to "0". In addition, the RObjID may be equal to "O1.ID". In this example, the single entry of the dmap 340 references only the object "O1". In other words, the RObjID ("O1.ID") equals the objectID ("O1.ID"). Using the dmap 340, the deduplicated object 326 may be written to the first edomain 330 in the same deduplicated form that existed on the dstore 312.

As previously stated, when an application 104 writes an object to a dstore 312, the dstore 312 may assign an objectID to it. The objectID may be a globally unique serial number that remains valid. For example, if an application writes an object with name "N" to a dstore, then the deletes the object, and subsequently creates a second object with the same name "N", the dstore may assign different objectID's to the two objects.

An objectID may be unique per object instance, and not per object name. In one configuration, an objectID may exist beyond the life of the object in the dstore to which it was originally assigned. For example, a first object may be written to a dstore, with three extents of data owned by the first object (i.e., the three extents of data are unique in the dstore, at the moment the data is written to it). At a later time, a second object may be written to the dstore that references one of the three extents of data owned by the first object. In one example, the first object is subsequently deleted from the dstore. The dmap of the first object may now include one entry that describes the single extent referenced by the second object. This single extent is still owned by the objectID of the first object even though the first object has since been deleted from the dstore.

Figure 4:
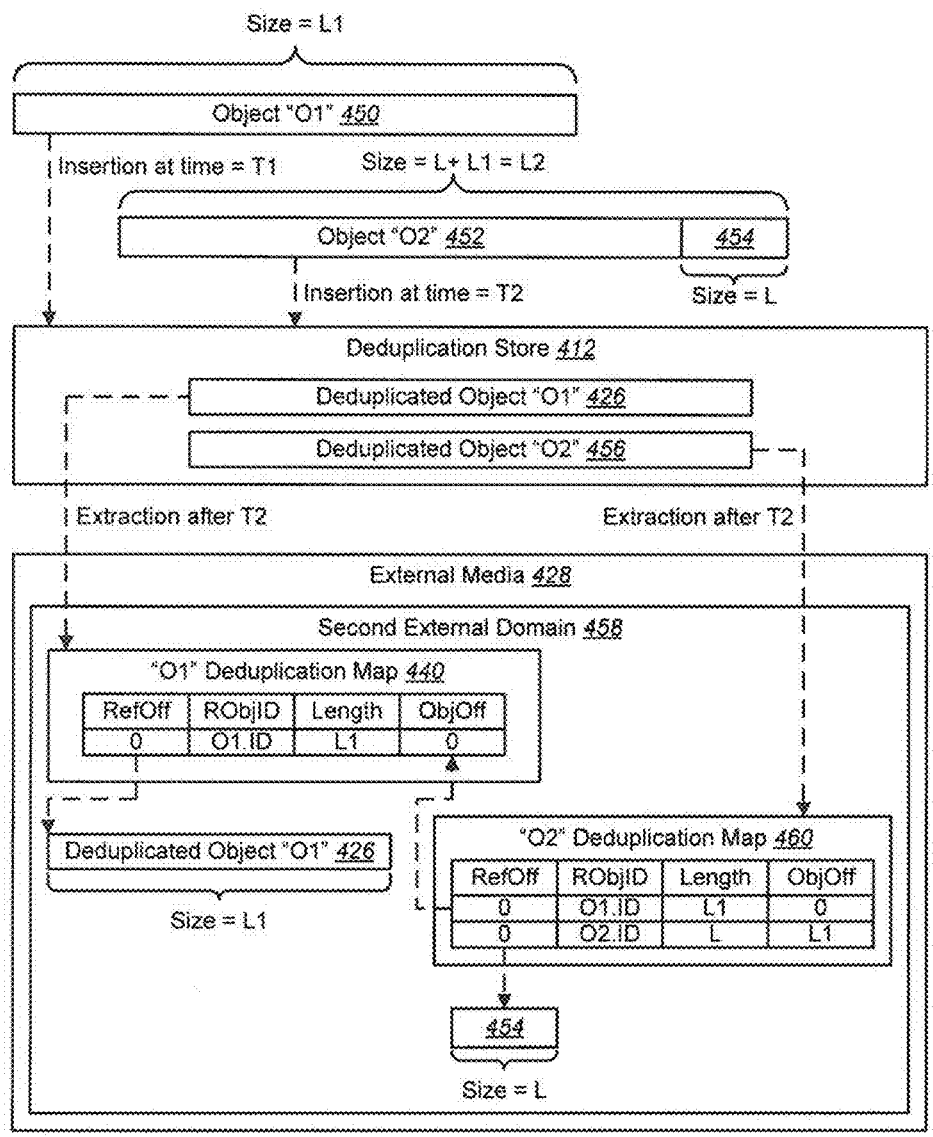
FIG. 4 is an example of multiple objects being written to a dstore and then later extracted to a second edomain on an external media.

FIG. 4 is an example of multiple objects 450, 452 being written to a dstore 412 and then later extracted to a second edomain 458 on an external media 428. In one embodiment, an object "O1" 450 and an object "O2" 452 may be written to the dstore 412. In one example, the object "O1" 450 has a size equal to L1. The object "O2" 452 may be identical to object "O1" 450 except for a single extent 454 of data that has a length (or size) equal to L. In other words, the size of "O2" 452 may be equal to the size of "O1" (L1) plus the size of the single extent 454 (L), which results in the overall size of "O2" being L2.

The object "O1" 450 may be inserted into the dstore 412 at a time equal to T1. In this example, the dstore 412 does not already include data that are in common with the data of the object "O1" 450. In other words, a deduplicated object "O1" 426 may be equal to the object "O1" 450. The dstore 412 may assign the objectID "O1.ID" to the deduplicated object "O1" 426.

After "O1" 450 is written to the dstore 412, the object "O2" 452 may be written to the dstore 412 at a time equal to T2. In one embodiment, the object "O2" 452 may be deduplicated to produce a deduplicated object "O2" 456. The dstore 412 may assign the objectID "O2.ID" to the deduplicated object "O2" 456. As previously explained, the majority of the data in "O2" 452 are contained within "O1" 450. In this example, the single extent 454, that has a length equal to L, is the only difference between "O2" 452 and "O1" 450. In one embodiment, the deduplicated object "O2" 456 may consist of the single extent 454, with the remaining portions being pointers to the deduplicated object "O1" 426.

In one embodiment, at a time subsequent to T2, the deduplicated objects "O1" 426 and "O2" 456 may be extracted to the second edomain 458. In one configuration, the second edomain 458 may be self-referential with respect to "O1" 450 and "O2" 452. In other words, the second edomain 458 may include all the data necessary to fully reconstruct both the object "O1" 450 and the object "O2" 452.

In one embodiment, the second edomain 458 may include an "O1" dmap 440 and an "O2" dmap 460. The objectID category (not shown) for the "O1" dmap 440 may be "O1.ID" and the objectID category (not shown) for the "O2" dmap 460 may be "O2.ID".

In one configuration, the "O1" dmap 440 may include a single entry that references a single object. In this example, the RObjID category equals the objectID category (i.e., RObjID=ObjID=O1.ID). In other words, the single entry in the "O1" dmap 440 only points to data owned by the deduplicated object "O1" 426. In one embodiment, the dmap 440 of "O1" indicates that the entire deduplicated object "O1" 426 is stored in the second edomain 458.

In this example, the "O2" dmap 460 may include two entries. As illustrated, the RObjID in the first entry is equal to O1.ID. In other words, the first entry in the dmap 460 is an inter-object reference that points to the deduplicated object "O1" 426. The RefOff in the first entry is a "0" which indicates that the dmap 460 should read the entry of the "O1" dmap 440 that includes the ObjOff "0" (in this example, the single entry of the "O1" dmap 440).

In one embodiment, the second entry of the "O2" dmap 460 includes the RObjID "O2.ID" which indicates that the second entry is pointing to data owned by the deduplicated object "O2" 456. In this example, the data in the deduplicated object "O2" 456 only consist of the single extent 454 (the rest of the deduplicated object "O2" 456 consists of pointers to the data in the deduplicated object "O1" 426). In other words, based on the dmaps 440, 460, the second edomain 458 stores the data for the deduplicated object "O2" 456 (which is equal to the single extent 454) and the data for the deduplicated object "O1" 426 (which is equal to the data of the object "O1" 450). In this example, the object application 104 may fully reconstruct the object "O1" 450 and the object "O2" 452 from the deduplicated data 426, 456 stored in the second edomain 458.

Figure 5:
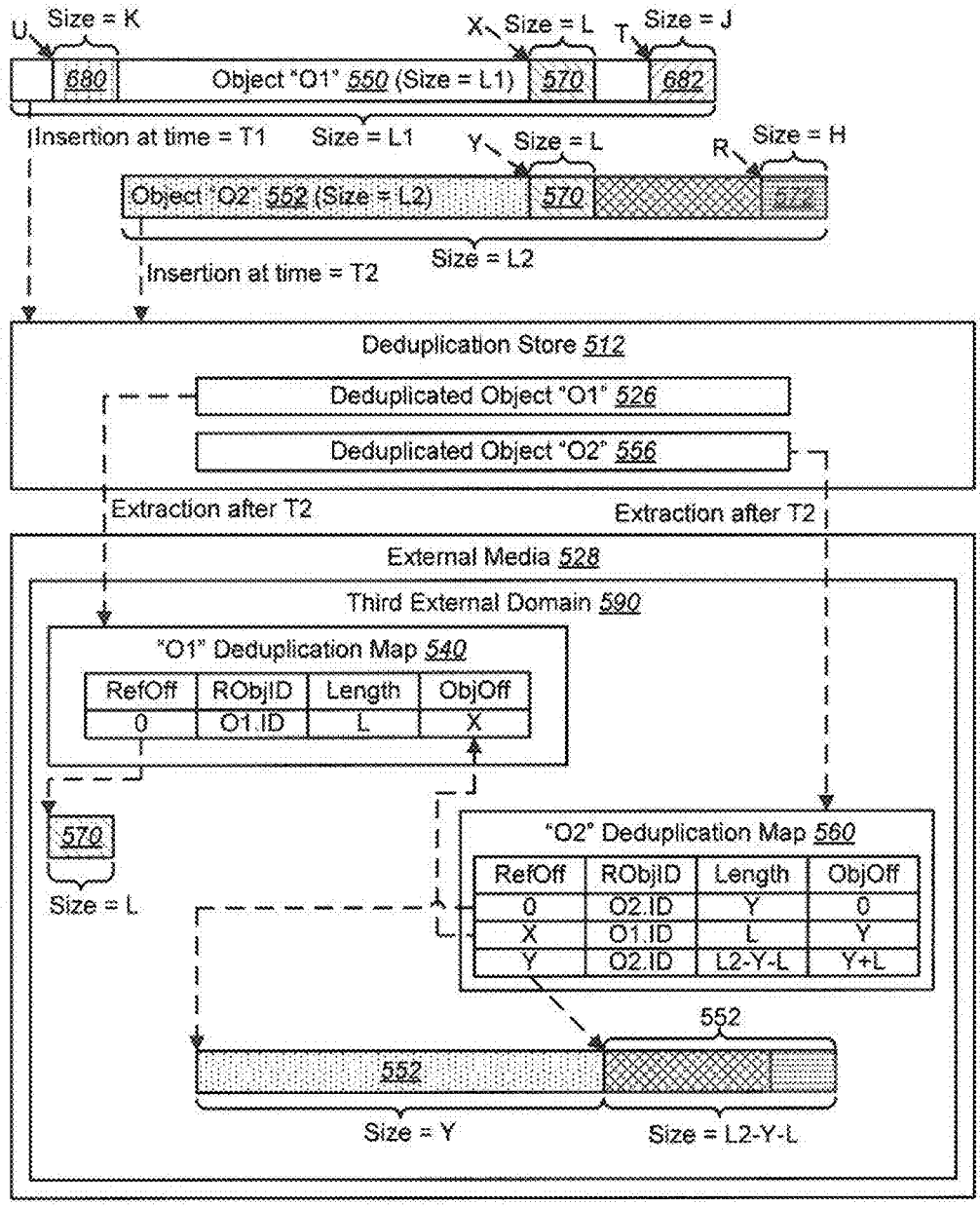
FIG. 5 is another example of object sets being written to a dstore and then later extracted to a third edomain on an external media.

FIG. 5 is another example of object sets being written to a dstore 512 and then later extracted to a third edomain 590 on an external media 528. In the example illustrated in FIG. 5, object "O1" 550 and object "O2" 552 may be written to the dstore 512. The object "O1" may be equal to size L1 and the object "O2" may be equal to the size L2. In one configuration, the dstore 512 may assign the objectID "O1.ID" to a deduplicated object "O1" 526 and the object ID "O2.ID" to a deduplicated object "O2" 556. As previously explained, the deduplicated object "O1" 526 and the deduplicated object "O2" 556 may be stored in an idomain of the dstore 512. Because idomains are fully self-referential, the entire data set comprising object "O1" 550 may be stored at time T1. At time T2, the entire data set comprising object "O2" 552 may be stored, except for an extent 570 that is identical to an extent 570 on "O1" 550. Instead of storing a second copy of the extent 570 for "O2", the deduplicated object "O2" 556 includes a pointer to the deduplicated object "O1" 526 for the extent 570.

At a later time, the deduplicated object "O2" 556 may be extracted to the third edomain 590, such that the edomain 590 is self-referential with respect to the object "O2" 552. In one example, the third edomain 590 is not self-referential with respect to the object "O1" 550. In other words, the third edomain 590 may store sufficient data that the object "O2" 552 may be fully reconstructed, but not the object "O1" 550. In one embodiment, the entire data set comprising the deduplicated object "O1" 526 may not need to be extracted and stored in the edomain 590 because the edomain 590 is not self-referential with respect to "O1".

In this example, the object "O2" 552 is entirely different from the object "O1" 550 except for the single shared extent 570 of length L at offset X in "O1" 550 and offset Y in "O2" 552. Additional extents 680 and 682 illustrated as part of "O1" 550 will be described with reference to FIG. 6.

A dmap 560 for "O2" in the third edomain 590 may include three entries, with each entry including the categories RefOff, RObjID, Length, and ObjOff. The entries may also include an objectID category (not shown). In this example, the objectID category may be "O2.ID" (i.e., the objectID assigned by the dstore 512). As illustrated by the dmap 560, two extents are owned by "O2" and one entry includes the shared extent 570 between "O2" and "O1". In other words, the dmap 560 includes references to deduplicated object "O2's" owned data except for a single pointer to the extent 570 that is part of the deduplicated object "O1". In one configuration, from the dmaps 540 560, the third edomain 590 stores a single copy of the extent 570 and the remaining portions of the object "O2" 552 that are not in common with "O1" 550. From this example, the object "O2" 552 may be fully reconstructed from the third edomain 590, while the object "O1" 550 cannot.

Figure 6:
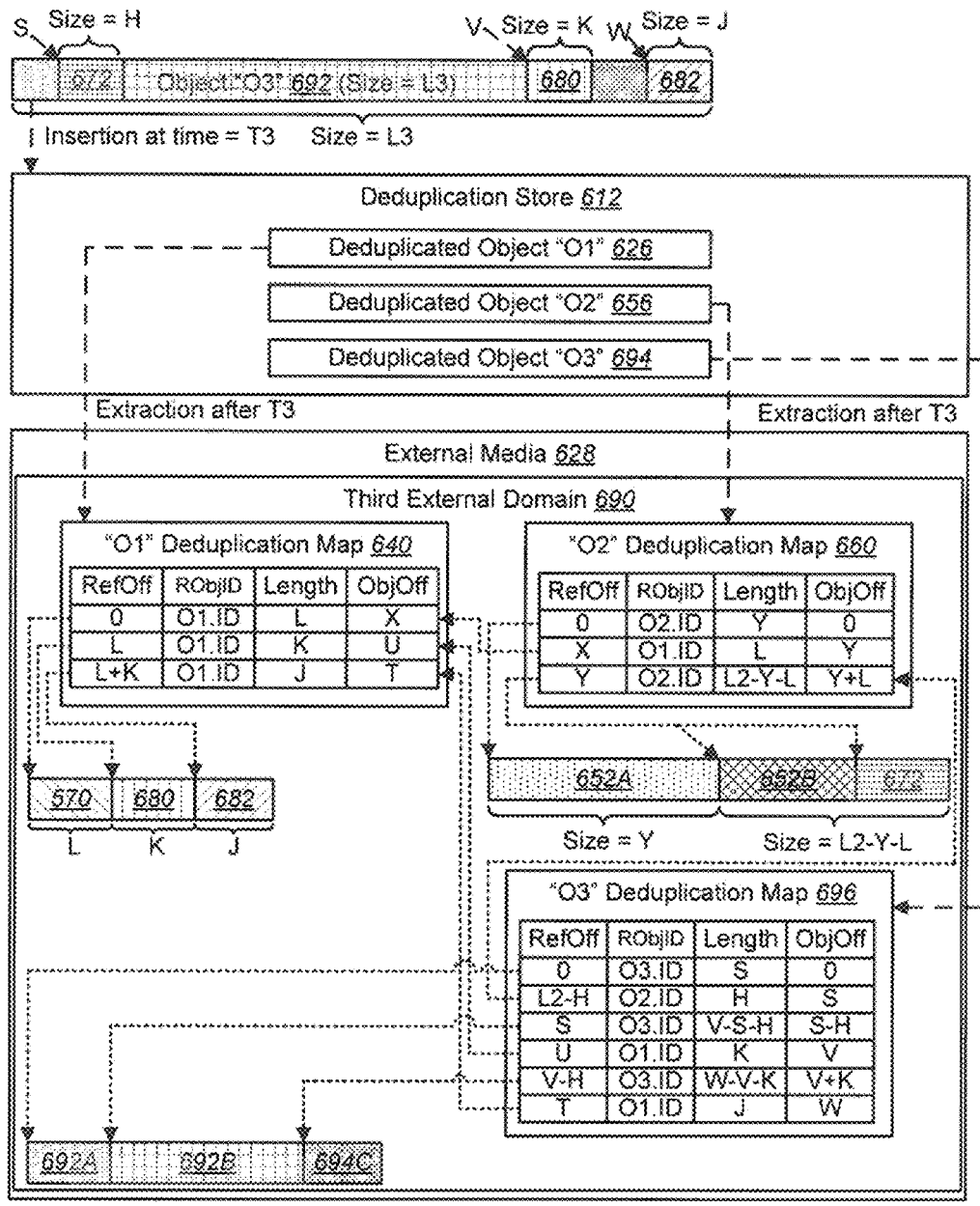
FIG. 6 is an additional example of three objects being written to a dstore, and then later extracted to a third edomain that is part of an external media.

FIG. 6 is an additional example of three objects 550, 552, 692 being written to a dstore 612, and then later extracted to a third edomain 690 that is part of an external media 628. Note that the object "O1" 550 and the object "O2" 552 are omitted from the illustration in FIG. 6 for clarity.

In one embodiment, an object "O3" 692 may be written to the dstore 612 at a time T3 as a deduplicated object "O3" 694. The object "O3" 692 may have a size equal to L3. The dstore 612 may assign the objectID "O3.ID" to the deduplicated object "O3" 694. At a time subsequent to the time T3, deduplicated object "O3" 694 may be extracted to the third external domain 690 such that the edomain 690 is self-referential with respect to "O3" 692 and "O2" 552 (but not "O1" 550).

In one example, the object "O3" 692 refers to six extents; three extents of owned data, two extents 680, 682 shared with "O1" 550, and one extent 672 shared with "O2" 552. Regarding the single shared extent 672 with "O2" 552, object "O2" 552 is fully extracted from the dstore 512 as explained in FIG. 5 so the single extent 672 is already present in the third edomain 690 as indicated by the dmap for "O2" 660.

The dmap "O1" 640 may include three entries for three extents 570, 680, 682. Regarding the three extents of "O1" 550, only the extent at object offset X 570 in "O1" 550 is already present in the dmap for "O1" 640 at a time subsequent to T3. As such, the two additional extents 680, 682 at offsets U and T in "O1" 550 are extracted from the dstore 612 and appended to the extent 570 stored in the third edomain 690. In addition, entries for these two additional extents may be added to the dmap for "O1" 640. The third edomain 690 may now be fully self-referential with respect to object "O2" 552 and object "O3" 692 but not with respect to object "O1" 550. In one embodiment, both object "O2" 552 and object "O3" 692 may be reconstructed from the data stored in the third edomain 690.

Figure 7:
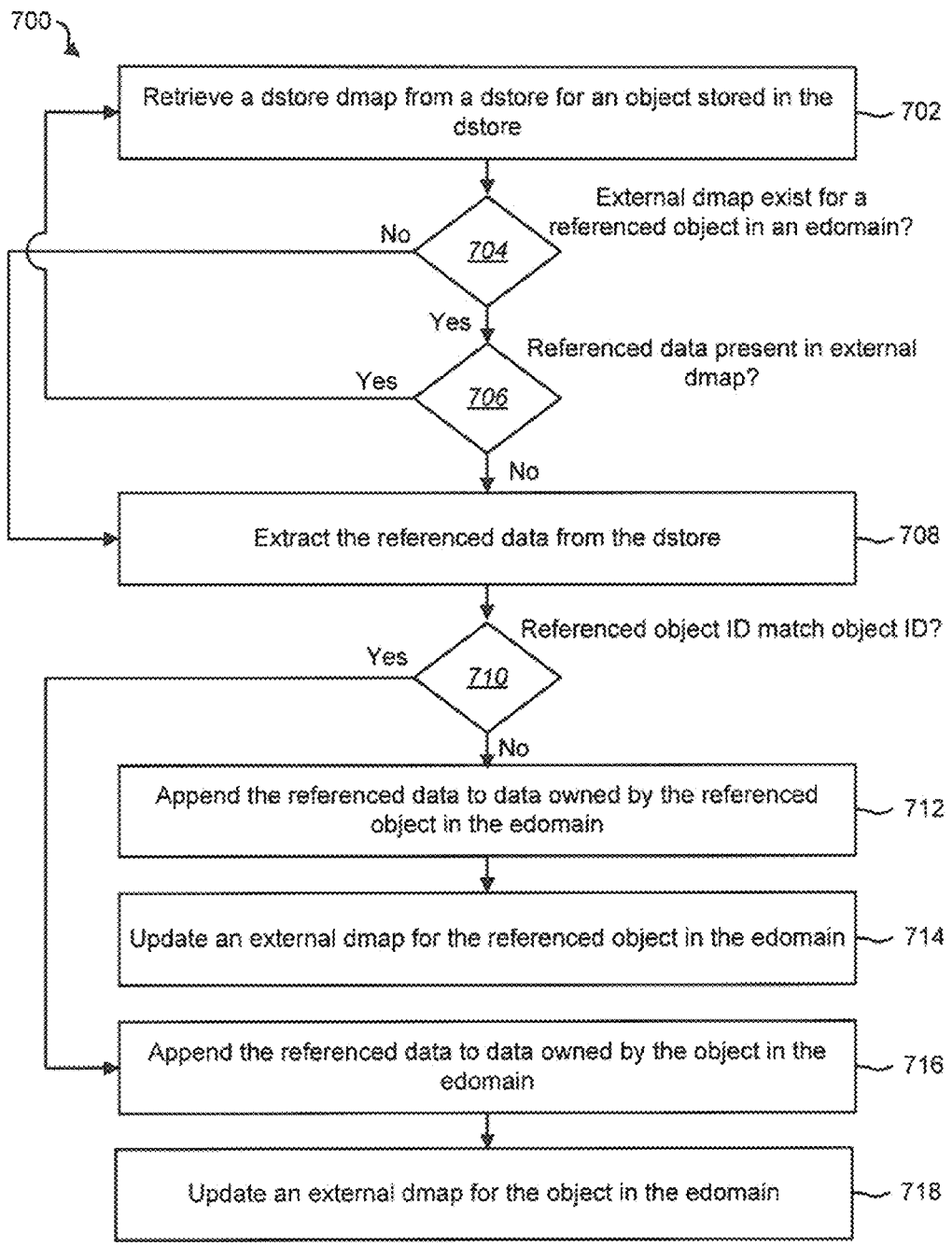
FIG. 7 is a flow diagram illustrating one embodiment of a method for extracting a deduplicated object set from a dstore and migrating the deduplicated object set into an edomain.

FIG. 7 is a flow diagram illustrating one embodiment of a method 700 for extracting a deduplicated object set from a dstore and migrating the deduplicated object set into an edomain. In one configuration, the object set is extracted from the dstore into the edomain such that the edomain is self-referential with respect to the object, using reads directly against objects in the dstore. In one embodiment, the method 700 may be implemented by the object application 104.

In one embodiment, a dstore dmap may be retrieved 702 from a dstore for an object stored in the dstore. In one configuration the dstore dmap may be retrieved via the object map interface 218 that interfaces with the object application 204. A determination may be made as to whether an external dmap exists for any object set referenced in the dstore dmap. The referenced object may be in an edomain. If it is determined 704 that an external dmap does exist for a referenced object stored in the edomain, a second determination 706 may be made as to whether data referenced in the dstore dmap are also present in the external dmap. If it is determined that the referenced data are already present in the external dmap, the method 700 may return to retrieve a dstore dmap for a different object set stored in the dstore. If it is determined 704 that an external dmap does not exist for a referenced object, or if it is determined 706 that the data referenced in the dstore dmap are not present in the external dmap, the referenced data may be extracted 708 from the dstore. The data may be extracted using the data read interface 220 that is part of the application interfaces 216 of the dstore 212.

A determination 710 may be made as to whether the ID of the object referenced in the external dmap matches the ID of the object associated with the external dmap. If it is determined 710 that the ID's match (i.e., the referenced object and the object are the same), the referenced data may be appended 716 to data owned by the object in the edomain. In addition, the external dmap in the edomain for the object may be updated 718. If, however, it is determined 710 that the ID for the referenced object does not match the ID of the object (i.e., the referenced object and the object are not the same), the referenced data may be appended 712 to data owned by the referenced object in the edomain. In addition, the external dmap for the referenced object in the edomain may be updated 714.

In one embodiment, the dstore may support optimized dstreams. An object application 104 may extract deduplicated data from the dstore using optimized streams. For example, the object set's dmap (i.e., dstore dmap) may be retrieved from the dstore using the getDedupMap interface. For each entry in the dstore dmap, an external dmap for the object referenced in the dstore dmap may be evaluated. The external dmap may exist in the edomain. If the referenced object's dmap exists in the edomain, and the referenced data are present in the referenced object's dmap, the data may not be required. In one embodiment, the external dmap entry for the length field may be set to zero.

In one configuration, the modified external dmap may be sent to the openDedupStream interface to obtain a stream handle. If the flag argument returned by the openDedupStream interface indicates that the stream's dmap differs from the dmap passed to the openDedupStream interface, the stream dmap may be retrieved using the getDedupStreamMap interface.

In one example, the required extents may be read using the readDedupStream interface. Each extracted extent may be stored for extraction by direct reads against objects. In one embodiment, the streamHandle interface may be closed using the closeDedupStream interface. When a set of objects are extracted into an empty edomain (when the edomain is first created), the step of determining whether the referenced object's dmap exists in the edomain may be omitted.

Figure 8:
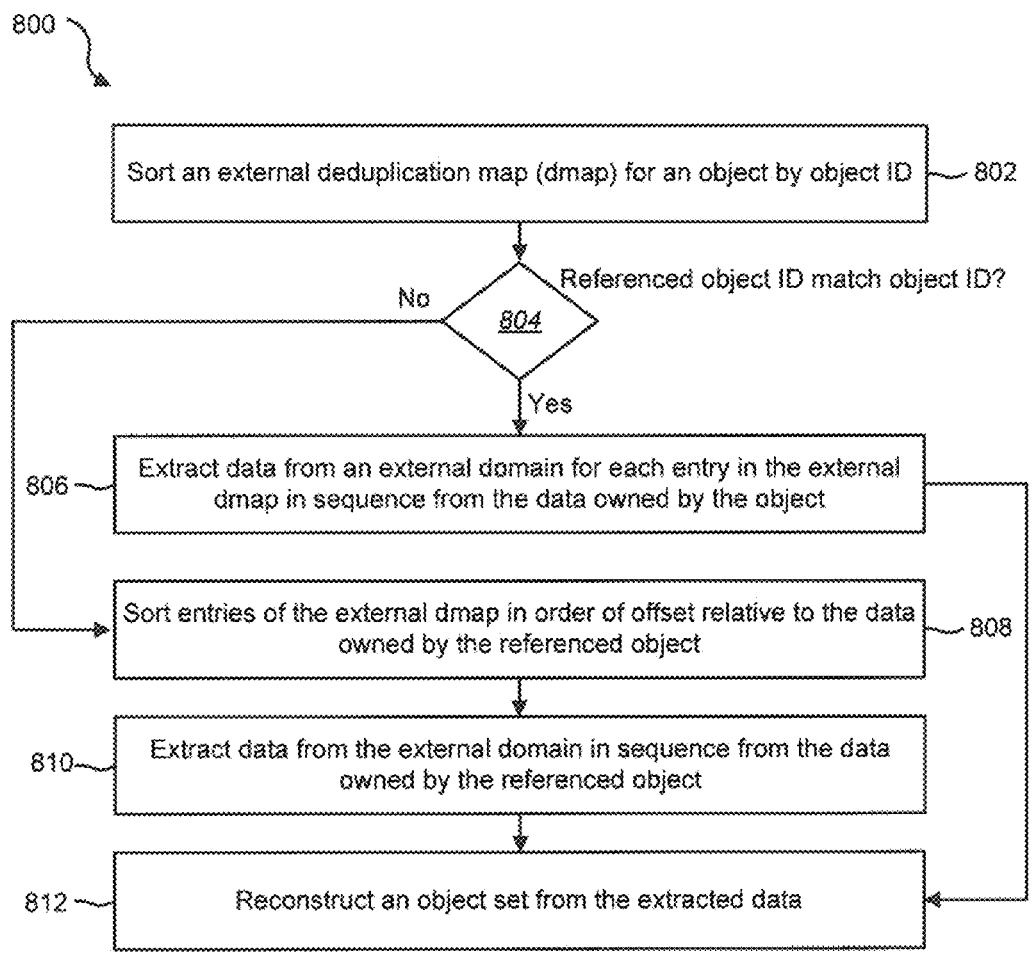
FIG. 8 is a flow diagram illustrating one embodiment of a method for reconstructing an object from a disk-resident edomain.

FIG. 8 is a flow diagram illustrating one embodiment of a method 800 for reconstructing an object from a disk-resident edomain. In one configuration, the method 800 may be implemented by the object application 104.

In one embodiment, an external dmap for an object may be sorted 802 by RObjID. A determination 804 may be made as to whether a the RObjID in each entry of the external dmap matches the ID of the object associated with the external dmap (i.e., the objectID). If it is determined that the RObjID matches the objectID for an entry in the external map, data from an edomain for that entry in the external dmap may be extracted 806 in sequence from the data owned by the object. The object may then be reconstructed 812 from the extracted data from the edomain. If, however, it is determined 804 that the RObjID does not match the objectID, entries of the external dmap may be sorted 808 in order of offsets relative to the data owned by the referenced object. In one embodiment, the data may be extracted 810 from the edomain in sequence from the data owned by the referenced object. The extracted data may then be used to reconstruct 812 the object set from the edomain.

If an edomain is disk-resident, the external dmap of each object in the edomain may be stored as a separate entity, for example, in a file. As successive objects are extracted from the dstore into the edomain, external dmaps may be updated.

For efficient operation on tape, creation of edomains and reconstruction of objects from them is broadly similar to disk-resident edomains, however the tape writes (and reads, during object reconstruction subsequently) may be minimized to the minimum number of sequential tape accesses, with the maximum degree of contiguity. In one embodiment, the operation of a tape-resident edomain may include determining the set of objects to be extracted into the edomain, and extracting the required objects. For each object, the object data may be contiguous on tape, and may be read sequentially from the dstore, with maximum contiguity, relative to the owning object in the dstore. In one embodiment, as objects are extracted, the corresponding dmaps may be created on temporary disk storage. When all objects have been extracted, the dmaps may be coalesced in temporary disk storage, into a single domain-wide dmap, and the may be written to tape as a single contiguous entity.

In one embodiment, to reconstruct an object from the edomain on tape, the domain-wide dmap may be restored to disk, and then objects of interest may be reconstructed as described above. Alternatively, the above sequence of operations may be done conveniently from a snapshot of a disk-resident edomain, where the edomain is staged to disk before being copied to tape. Object data may be copied to tape in order of object offset, with dmaps rearranged accordingly (for example, the entries of a dmap are not always in order of object offset, assuming entries are appended to the dmap when the dmap is created).

Figure 9:
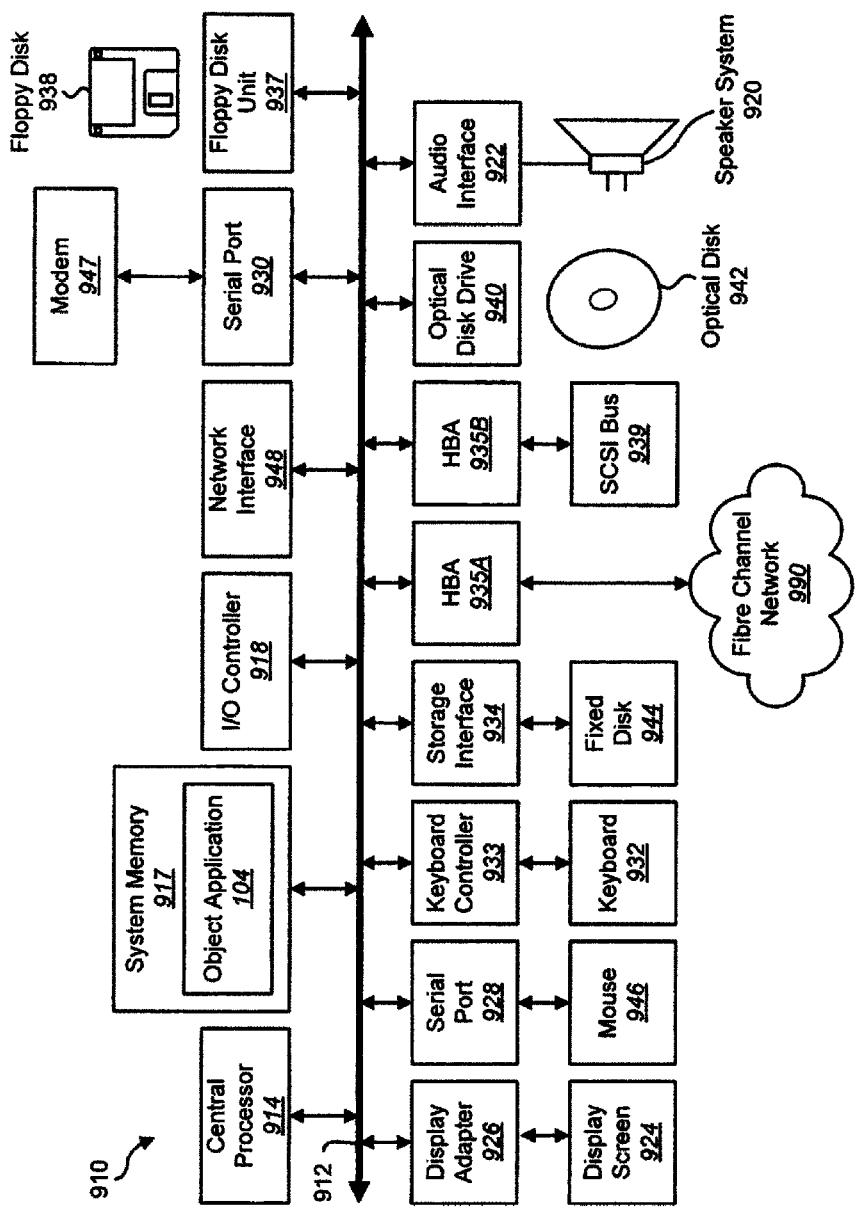
FIG. 9 depicts a block diagram of a computer system suitable for implementing the present systems and methods.

FIG. 9 depicts a block diagram of a computer system 910 suitable for implementing the present systems and methods. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the object application 104 to implement the present systems and methods may be stored within the system memory 917. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
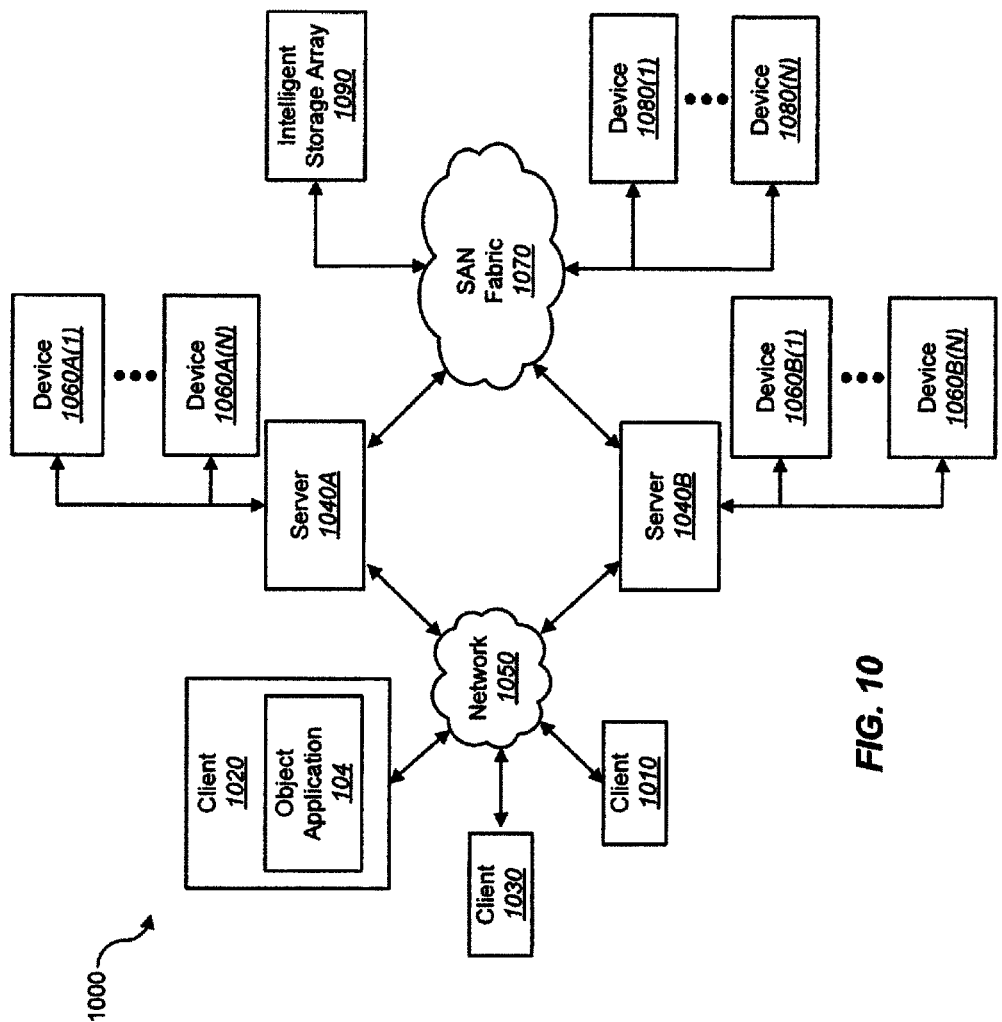
FIG. 10 is a block diagram depicting a network architecture in which client systems, as well as storage servers are coupled to a network.

FIG. 10 is a block diagram depicting a network architecture 1000 in which client systems 1010, 1020 and 1030, as well as storage servers 1040A and 1040B (any of which can be implemented using computer system 1010), are coupled to a network 1050. In one embodiment, the object application 104 to implement the present systems and methods may be located within a client system 1010, 1020, 1030. The storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation of the disclosure. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 840B or one of storage devices 1060A(1)-(N), 1060B(1)-(N), 1080(1)-(N) or intelligent storage array 1090. FIG. 10 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method comprising:
   retrieving a deduplication store (dstore) deduplication map (dmap) from a dstore for an object stored in the dstore, the dstore dmap referencing at least one extent of deduplicated data needed to reconstruct the object, the dstore dmap referencing deduplicated data in the dstore;
   determining whether at least a portion of the at least one extent of data referenced in the dstore dmap exists in an external domain;
   upon determining that at least a portion of the at least one extent of data does not exist in the external domain, extracting the portion of the at least one extent of data that does not exist in the external domain from the dstore;
   generating an external dmap that references any portion of the at least one extent of data extracted from the dstore and any portion of the at least one extent of data that existed in the external domain; and
   reconstructing the object based on the external dmap.

2. The method of claim 1, further comprising determining whether the identification of an object referenced in the dstore dmap matches the identification of an object associated with the external dmap.

3. The method of claim 2, further comprising appending the data referenced in the dstore dmap to data owned by the object associated with the external dmap, if the identification of the object referenced in the dstore dmap matches the identification of the object associated with the external dmap.

4. The method of claim 3, further comprising updating the external dmap of the object in the external domain.

5. The method of claim 2, further comprising appending the data referenced in the dstore dmap to data owned by the object referenced in the external dmap, if the identification of the object referenced in the dstore dmap does not match the identification of the object associated with the external dmap.

6. The method of claim 5, further comprising updating the external dmap of the referenced object in the external domain.

7. The method of claim 1, wherein the external dmap comprise an entry for each extent of data present in the object.

8. The method of claim 1, wherein the external dmap comprises pointers configured to point to private data stored as part of the object.

9. The method of claim 1, wherein the external dmap comprises pointers configured to point to shared data stored as part of a second object in the dstore.

10. The method of claim 9, wherein the pointers configured to point to shared data are independent of an internal deduplication mechanism of the dstore.

11. A computer system, comprising:
    a processor;
    memory in electronic communication with the processor;
    an object application stored in the memory and configured to:
       retrieve a deduplication store (dstore) deduplication map (dmap) from a dstore for an object stored in the dstore, the dstore dmap referencing at least one extent of deduplicated data needed to reconstruct the object, the dstore dmap referencing deduplicated data in the dstore;
       determine whether at least a portion of the at least one extent of data referenced in the dstore dmap exists in an external domain;
       upon determining that at least a portion of the at least one extent of data does not exist in the external domain, extract the portion of the at least one extent of data that does not exist in the external domain from the dstore;
       generate an external dmap that references any portion of the at least one extent of data extracted from the dstore and any portion of the at least one extent of data that existed in the external domain; and
       reconstruct the object based on the external dmap.

12. The computer system of claim 11, wherein the application is further configured to determine whether the identification of an object referenced in the dstore dmap matches the identification of an object associated with the external dmap.

13. The computer system of claim 12, wherein the application is further configured to append the data referenced in the dstore dmap to data owned by the object associated with the external dmap, if the identification of the object referenced in the dstore dmap matches the identification of the object associated with the external dmap.

14. The computer system of claim 13, wherein the application is further configured to update the external dmap of the object in the external domain.

15. The computer system of claim 12, wherein the application is further configured to append the data referenced in the dstore dmap to data owned by the object referenced in the external dmap, if the identification of the object referenced in the dstore dmap does not match the identification of the object associated with the external dmap.

16. The computer system of claim 11, wherein the external dmap comprise an entry for each extent of data present in the object.

17. The computer system of claim 11, wherein the external dmap comprises pointers configured to point to private data stored as part of the object.

18. The computer system of claim 11, wherein the external dmap comprises pointers configured to point to shared data stored as part of a second object in the dstore.

19. The computer system of claim 18, wherein the pointers configured to point to shared data are independent of an internal deduplication mechanism of the dstore.

20. A computer-program product comprising a non-transitory computer-readable storage medium having instructions thereon, the instructions comprising:
    code programmed to retrieve a deduplication store (dstore) deduplication map (dmap) from a dstore for an object stored in the dstore, the dstore dmap referencing at least one extent of deduplicated data needed to reconstruct the object, the dstore dmap referencing deduplicated data in the dstore;
    code programmed to determine whether at least a portion of the at least one extent of data referenced in the dstore dmap exists in an external domain;
    upon determining that at least a portion of the at least one extent of data does not exist in the external domain, code programmed to extract the portion of the at least one extent of data that does not exist in the external domain from the dstore;
    code programmed to generate an external dmap that references any portion of the at least one extent of data extracted from the dstore and any portion of the at least one extent of data that existed in the external domain; and code programmed to reconstruct the object based on the external dmap.

* * * * *